United States Patent [19]

Bartolo et al.

[11] Patent Number: 5,745,338
[45] Date of Patent: Apr. 28, 1998

[54] DEVICE FOR ASSEMBLY AND ELECTRICAL CONNECTION OF MODULAR APPARATUSES SUCH AS CIRCUIT BREAKERS OR SIMILAR

[75] Inventors: William Bartolo, Eybens; Noël Lecorre, St. Hilaire du Touvet; Francois Reynaud, Reaumont, all of France

[73] Assignee: Schneider Electric S.A., France

[21] Appl. No.: 646,107

[22] Filed: May 7, 1996

[30] Foreign Application Priority Data

Jun. 7, 1995 [FR] France .................................. 95 07014

[51] Int. Cl.[6] .................................................. H02B 1/20
[52] U.S. Cl. .......................... 361/637; 439/110; 439/716
[58] Field of Search ................................ 361/627–631, 361/634, 636–640, 673, 733, 735, 744; 439/110, 116, 121, 716, 891

[56] References Cited

U.S. PATENT DOCUMENTS

| 5,094,626 | 3/1992 | Fabrizi et al. .......................... 361/637 |
| 5,486,979 | 1/1996 | Bowen et al. .......................... 361/640 |

FOREIGN PATENT DOCUMENTS

| 0229590 | 7/1987 | European Pat. Off. . |
| 0237388 | 9/1987 | European Pat. Off. . |
| 0466043 | 1/1992 | European Pat. Off. . |
| 0467171 | 1/1992 | European Pat. Off. . |
| 0472409 | 2/1992 | European Pat. Off. . |
| 2438359 | 4/1980 | France . |
| 3023499 | 1/1982 | Germany . |

*Primary Examiner*—Gregory D. Thompson
*Attorney, Agent, or Firm*—Parkhurst & Wendel, L.L.P.

[57] ABSTRACT

The present invention relates to a circuit breaker device for assembly and electrical connection of modular power apparatuses. This device is designed to perform electrical connection of a plurality of power apparatuses, such as circuit breakers, installed together on the same mounting rail with auxiliary units. The set of electrical power apparatuses are electrically connected and/or supplied with power up-line by a connecting comb. This comb is in the form of a bus comprising at least one conducting bar extending generally parallel to the longitudinal direction of the rail and generally perpendicularly to one of the faces of the cases, the bars each being connected to one of the phases or to the neutral. Contact strips of the power apparatuses are electrically and selectively connected up-line to one conducting bar by a connector in the form of double-blades or double-grips, cooperating via one of their ends with the contact strips of the apparatuses and via their opposite ends with the conducting bars.

13 Claims, 8 Drawing Sheets

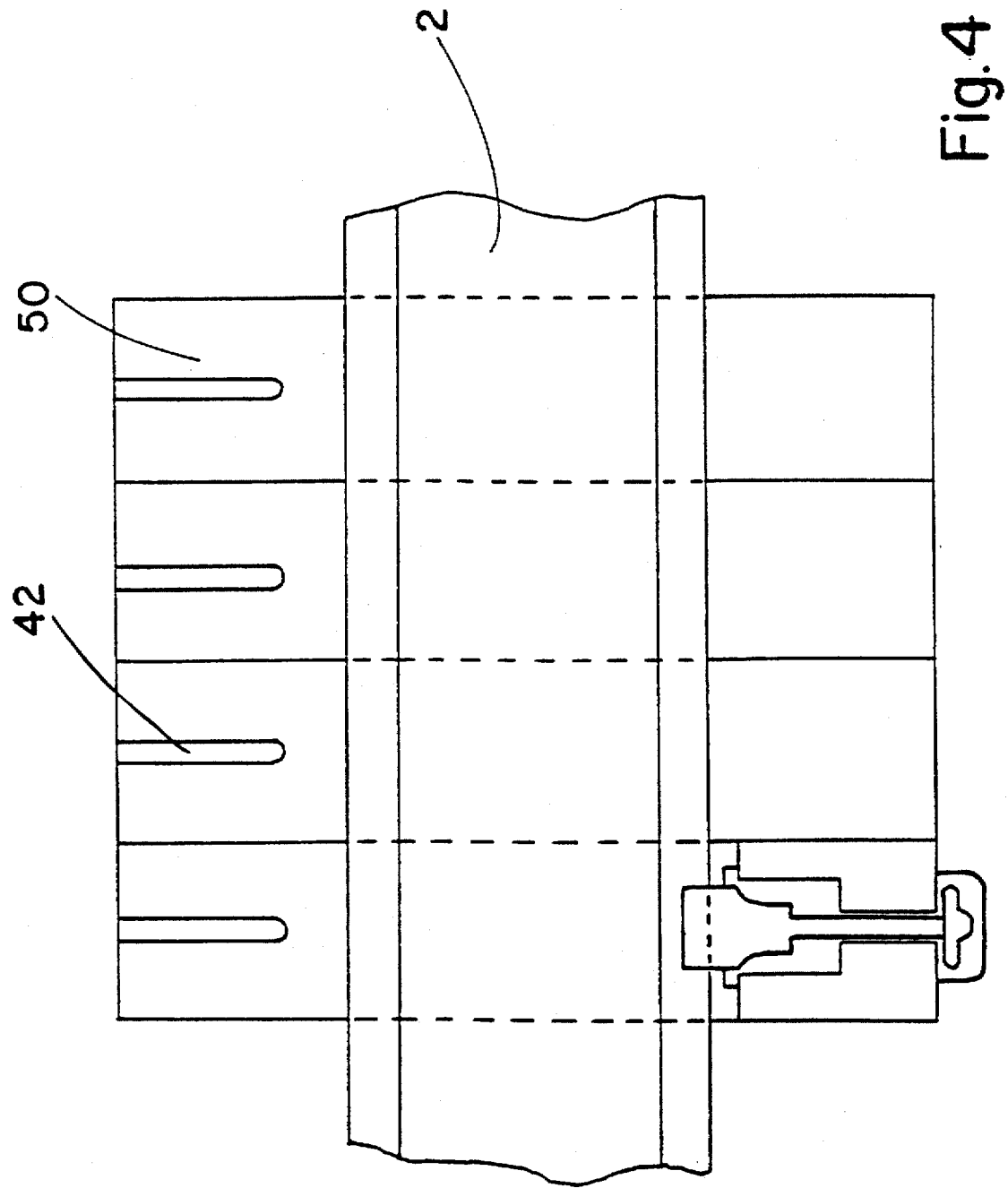

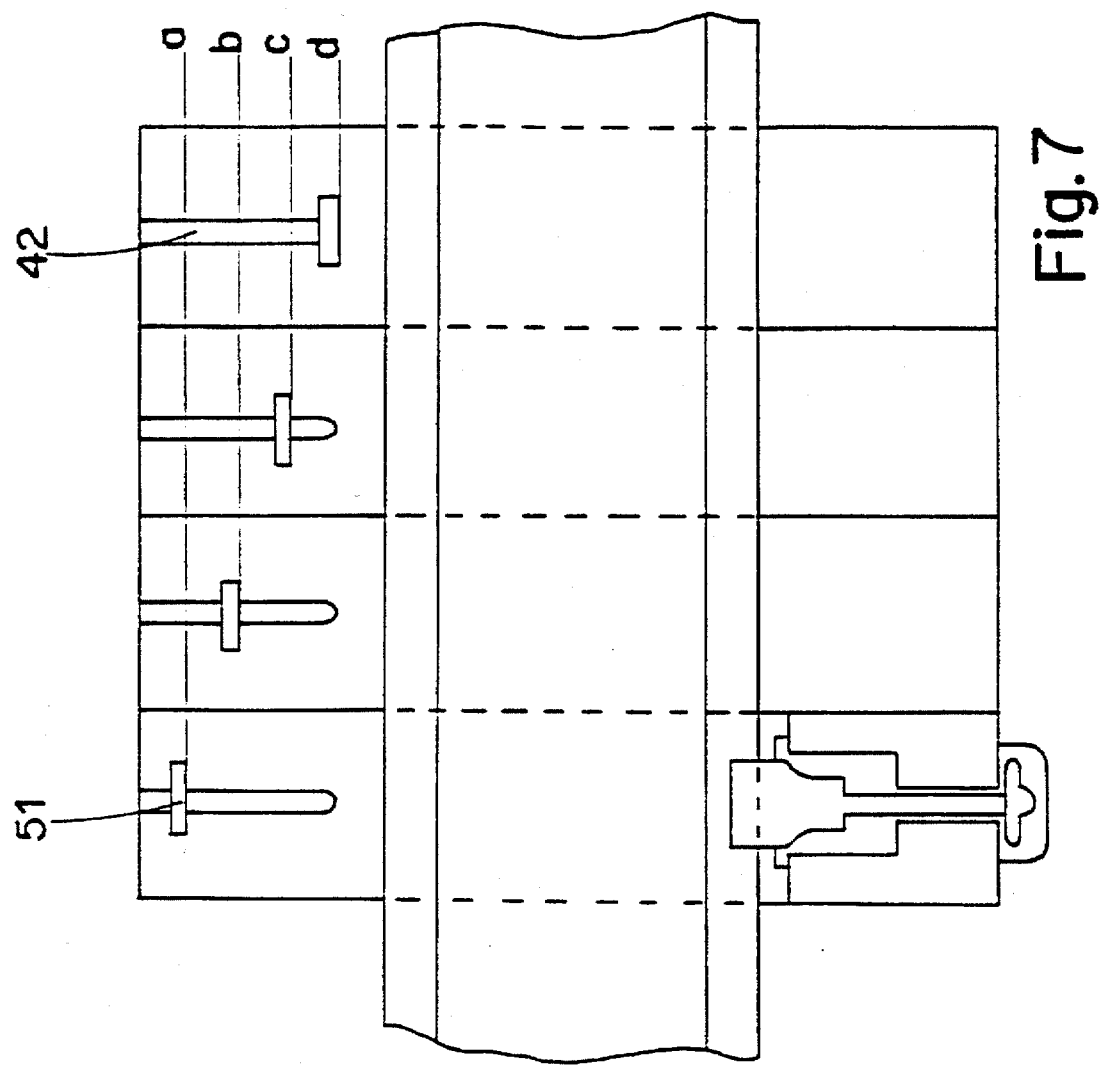
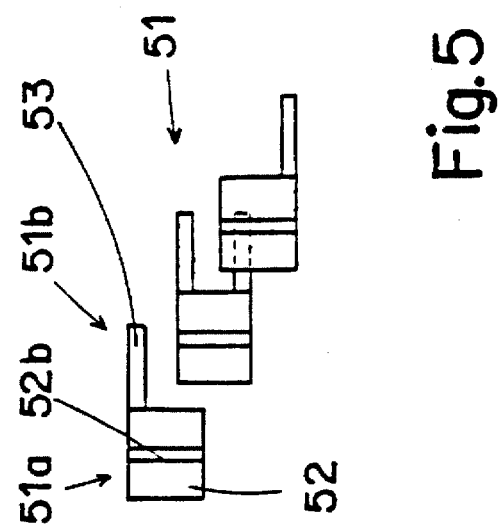
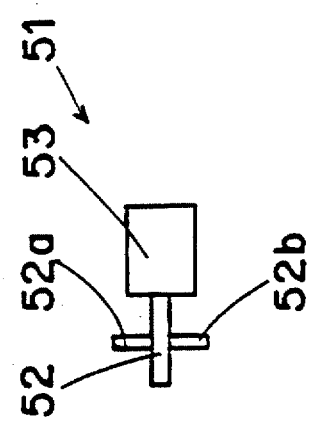

DEVICE FOR ASSEMBLY AND ELECTRICAL CONNECTION OF MODULAR APPARATUSES SUCH AS CIRCUIT BREAKERS OR SIMILAR

BACKGROUND OF THE INVENTION

The invention relates to a device for assembly and electrical connection of a plurality of power apparatuses such as circuit breakers installed together on the same mounting rail with auxiliary units or the like, said apparatuses and units comprising modular cases adjoined by their side faces so as to form a horizontal row, the set of electrical power apparatuses being electrically connected and/or supplied with power up-line by a common connecting comb extending parallel to the longitudinal direction of the rail.

Fitting apparatuses of different pitches or of different kinds, for example power apparatuses such as circuit breakers or auxiliary modules, notably a differential trip device, a fault or contact position indication module etc., up to now, had the power apparatuses supplied by a standard comb, removing the unused teeth. This removal is generally performed at the level of each auxiliary module by previously sawing said teeth off. This has the result that if the fitter subsequently wants to modify the modular arrangement of the apparatuses, the precut comb is liable to be unsuitable for the new arrangement, and has to be thrown away. Preparation of the comb for each specific row moreover increases the time required for connection.

SUMMARY OF THE INVENTION

The present invention solves these problems and proposes a device for assembly and connection of electrical apparatuses, of simple design enabling apparatuses of different pitches and of different kinds to be mixed on the same rail, the power apparatuses being connected to a common comb in a fast and economical manner.

The object of the present invention is to achieve a device for assembly and electrical connection of modular apparatuses, characterized in that the above-mentioned connecting comb is in the form of a bus comprising one or more conducting bars, extending appreciably parallel to the longitudinal direction of the rail, and appreciably perpendicularly to one of the faces of the cases located facing the comb. The bars are connected to one of the phases or to the neutral, and in each of the contact strips of the power apparatuses is electrically and selectively connected up-line to one of the conducting bars by a connector. Each connector comprises a first end electrically connected to the above-mentioned strip via an opening arranged in the corresponding face of the case. A second end is designed to engage with the selected conducting bar and to move along it so as to establish the electrical connection, in any longitudinal position of the bar.

According to a particular embodiment of the invention, the comb is located facing the rear upper faces of the modular apparatuses.

According to a particular feature of the invention, the contact strips of each power apparatus comprises an end part housed in a groove of the case. The groove is open in the direction of the comb, and the end part and the groove extend perpendicularly to the bars over roughly the whole height of the comb. This enables the connector to be connected to the contact strip in several positions along the end part, corresponding to the different positions of the bars.

According to a first embodiment, the above-mentioned end part of the contact strip is formed by a grip housed in the bottom of the groove, the grip being designed to cooperate with an end part in the form of a knife-blade of the connector.

According to an alternative embodiment, the above-mentioned end part of the contact strip is formed by a knife-blade extending perpendicularly to the bars, the knife-blade being designed to cooperate with an end of the connector in the form of a grip.

According to another feature, the above-mentioned comb (or bus) comprises an insulating profiled section formed by a support extending parallel to the surface of the rail. Spacers extend perpendicularly to the support and a bar being housed in each space separates two consecutive spacers.

According to a particular feature, the second end of the connectors is formed by a knife-blade and each of the bars is securedly united to a flexible blade curved under the bar, the knife-blade being engaged and held between the bar and the flexible blade in the contact position.

According to an alternative embodiment, the second end of the connectors is formed by a grip designed to engage with one of the bars fixed on the above-mentioned support between two spacers.

Advantageously, each connector is formed by two perpendicular knife-blades or by two grips placed end to end whose gripping forces are perpendicular.

Advantageously, the first end of the connectors is provided with transverse guiding elements cooperating with a corresponding groove provided in the case in order to improve the positioning of the connector in the case.

According to another feature, the single-pole or multipole electrical power apparatuses are formed as required by circuit breakers, contactors, switches and remote-controlled switches, and the auxiliary units comprise at least one fault indication SD and/or contact position CAOF module, an undervoltage MN or shunt MX trip module, and a differential tripping module.

According to another embodiment of the invention, the connectors are integral parts of the end parts of the corresponding contact strips.

According to yet another embodiment, the connectors are securedly united for example by welding to the end parts of the corresponding contact strips.

BRIEF DESCRIPTION OF THE DRAWINGS

But other advantages and features of the invention will become more clearly apparent from the following detailed description which refers to the accompanying drawings given for example purposes only and in which:

FIG. 4 is a schematic rear view of a three-pole plus neutral apparatus, without the connecting elements to the comb.

FIG. 5 illustrates in a side view connecting elements (or connectors) in the form of knife-blades according to a particular embodiment of the invention, in four different positions.

FIG. 6 is a bottom view of one of the knife-blades.

FIG. 7 is a similar view to FIG. 4, four knife-blade connectors having been mounted on the three-pole plus neutral circuit breaker.

DETAILED DESCRIPTION OF THE PREFERRED EMBODIMENT

Figure 1:
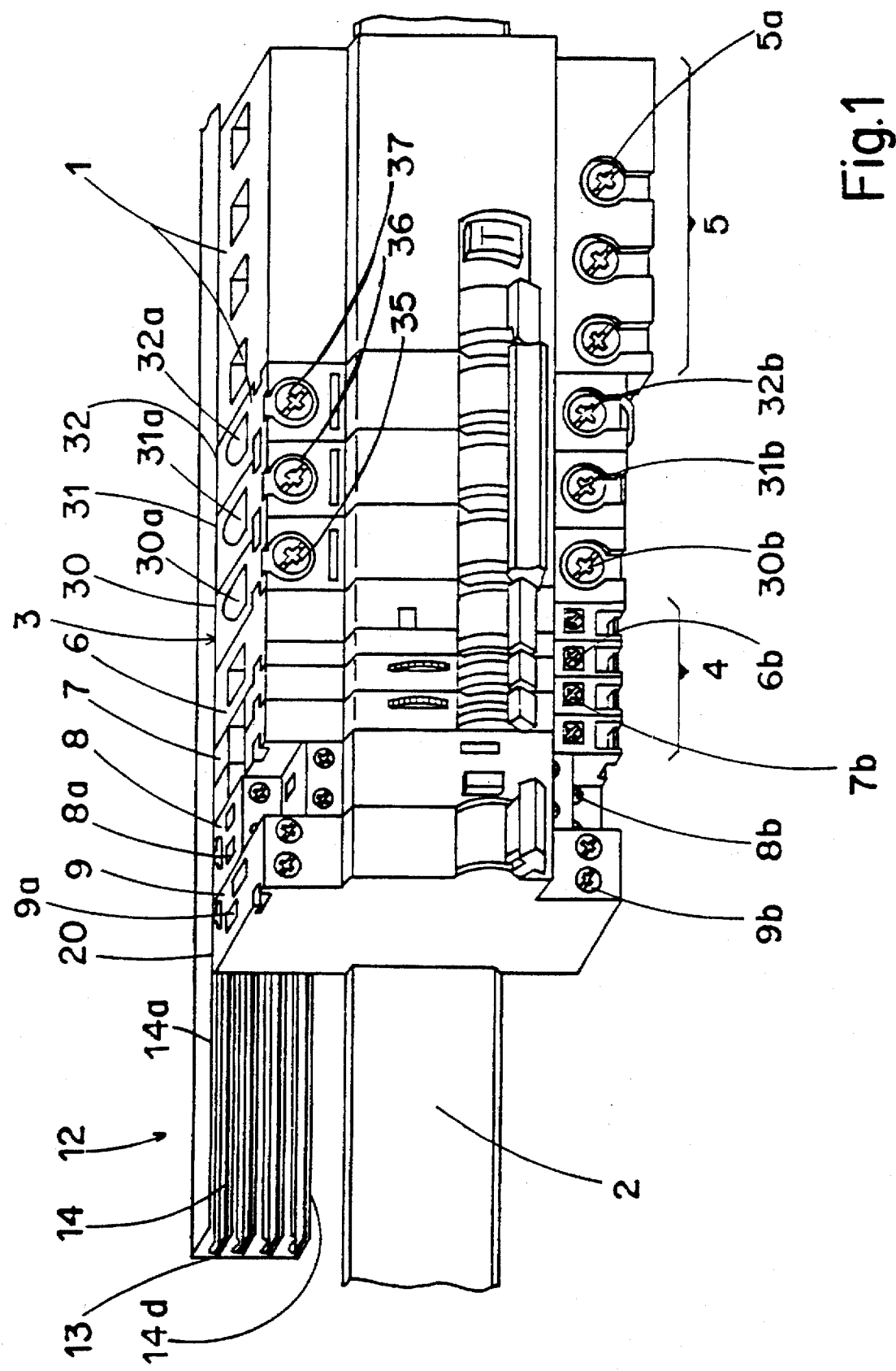
FIG. 1 is a schematic perspective view of a row of modular electrical apparatuses mounted on a rail, comprising auxiliary units and power apparatuses electrically connected according to the invention.

In FIG. 1, a plurality of electrical apparatuses 1 with modular cases can be seen fixed to a mounting rail 2 and adjoined by their side faces forming a horizontal row.

This row comprises a three-phase circuit breaker unit 3 formed by three single-pole circuit breakers 30, 31, 32 of the type described in French Patent 2,616,583. . Several auxiliary units 4, 5 are coupled to the circuit breaker unit 3, notably tripping, control and indicator units. On the right side of the circuit breaker unit 3, an auxiliary differential tripping unit 5 is located. On the left side of the circuit breaker unit 3, there are arranged an auxiliary undervoltage MN or shunt MX differential tripping module 6, a fault indication SD and/or contact position CAOF module 7, a control and monitoring apparatus 8 and a single-pole plus neutral switch 9.

It should be noted that this row could comprise additional circuit breakers and other power apparatuses, such as contactors, switches, remote-controlled switches, etc. Each of the poles of these power apparatuses 30, 31, 32, 8 and 9 comprises a power supply terminal 30a, 31a, 32a, 8a, 9a and a line or feeder terminal 30b, 31b, 32b, 8b, 9b located respectively on the opposite narrow side faces of the modular case. The auxiliary differential tripping unit 5 is equipped on its lower face with connection terminals 5a, whereas the other upper face does not have any terminals. The electrical connection between the two units 3, 5 is performed by means of a bundle of connecting conductors (not represented) connected to the corresponding connection terminals.

Each of the auxiliary modules 6, 7 is provided with connection terminals 6b, 7b located along its bottom face, whereas these auxiliary modules do not have any terminals on their upper face.

According to the invention, the power supply terminals 30a, 31a, 32a, 8a, 9a of all the circuit breakers 3 and other power apparatuses 8, 9 except for the auxiliary modules of any one row are interconnected by a common power supply bus (or comb) 12 constituted mainly by a vertical insulating support 13 from which five horizontal conducting bars 14 extend, parallel to one another and to the longitudinal direction of the rail 2. This bus 12 is fixed to a support surface 15 (which can be seen in FIG. 11), either common or staggered depthwise with respect to the one supporting the rail 2, at a height such that the first bar 14a extends slightly below the upper face 20 of the apparatuses, and that the last bar 14d extends above the upper edge of the rail 2.

Figure 2:
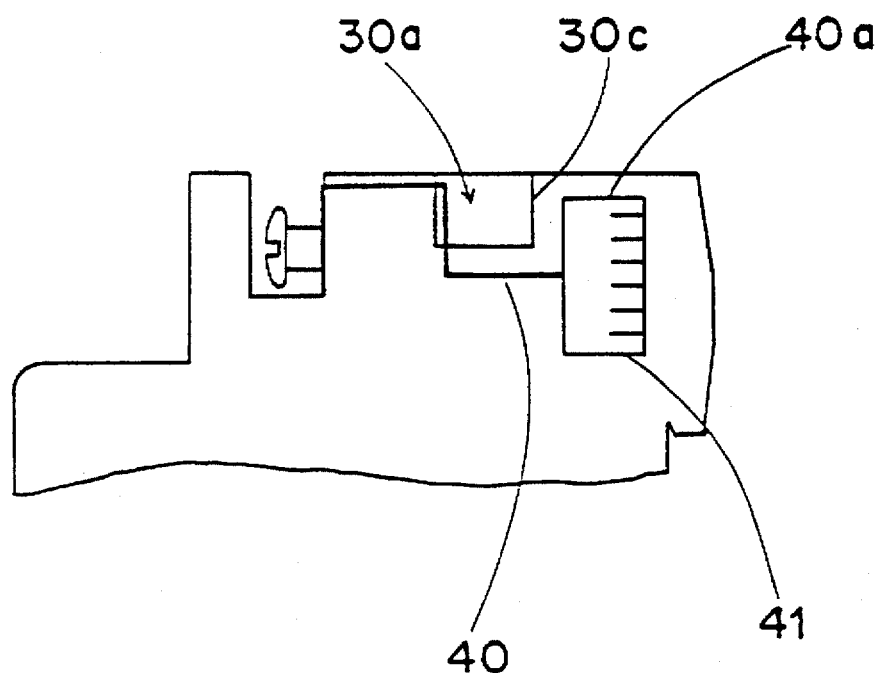
FIG. 2 is a partial sectional view, illustrating more particularly the upper and rear part of a single-pole apparatus.
Figure 3:
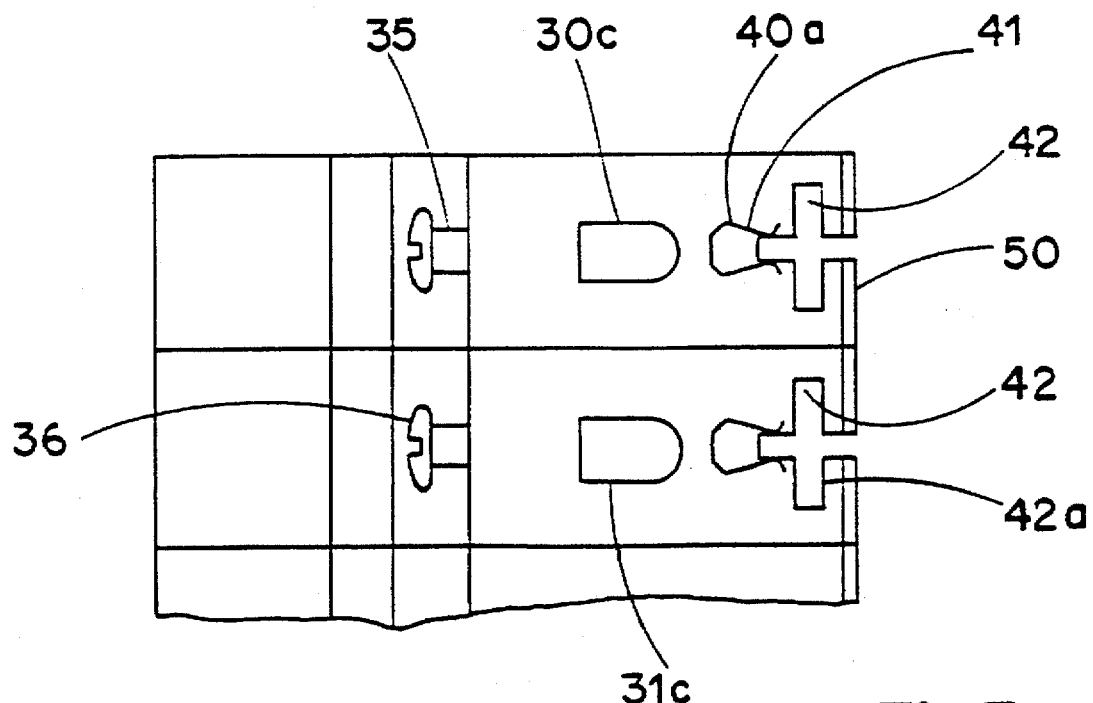
FIG. 3 is a partial bottom view of the previous figure, illustrating two adjoined single-pole apparatuses.

As can also be seen in FIGS. 2 and 3 and in a manner known as such, the power supply terminals 30a, 31a, 32a, 8a, 9a of the power apparatuses 3, 8, 9 are located in tunnels 30c, 31c and can be connected to electrical cables, a conventional connecting comb (not represented) whose teeth penetrate into the tunnels, or a forked single-pole connecting comb (not represented) whose teeth pass under the heads of screws 35, 36, 37, and are secured by tightening the screws accessible via openings.

Figure 9:
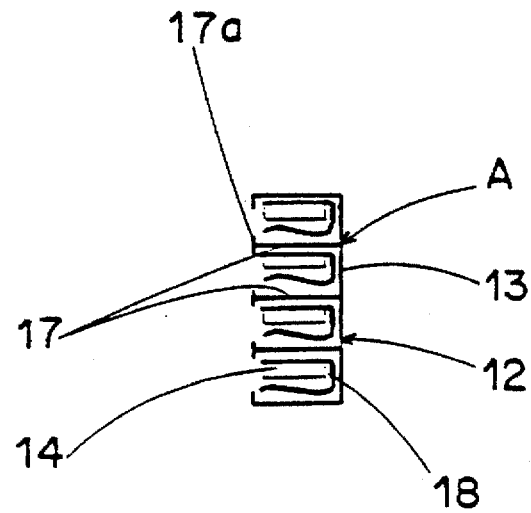
FIG. 9 is a transverse sectional view of the bus of FIG. 8.
Figure 8:
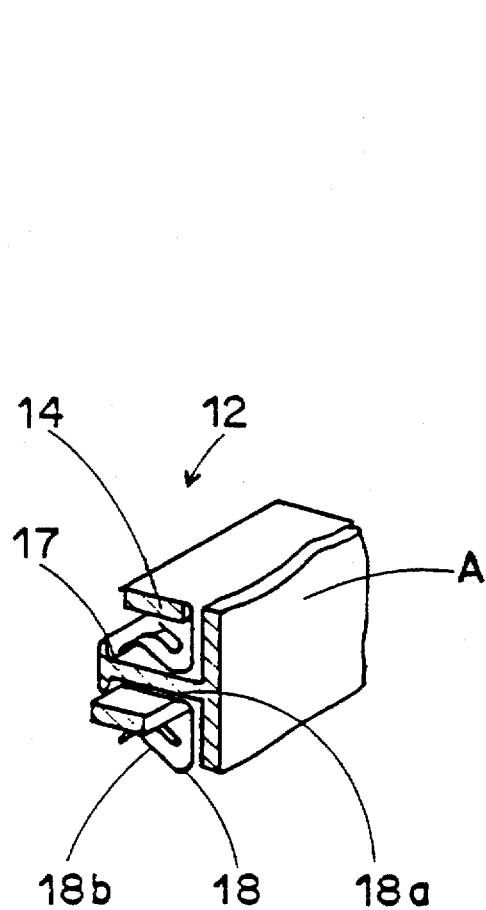
FIG. 8 is a partial perspective view of a power supply bus (or comb) according to a particular embodiment of the invention.
Figure 10:
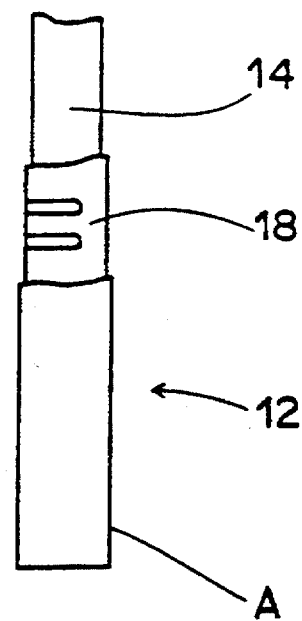
FIG. 10 schematically illustrates the three components of the bus of FIG. 9.

According to a particular embodiment of the invention, the contact strips of the power supply terminals 30a, 31a . . . are each extended towards the rear of the apparatuses forming at their end 40a a grip 41 housed in a groove 42 (FIG. 3, 4) provided in the upper rear part of the cases and extending approximately over the whole height of the above-mentioned power supply bus 12, located facing the rear face 50 of the cases. This groove 42, as can be seen in FIG. 3, presents a cross-shaped transverse section and is designed to receive a connector 51 in the form of a double-blade as represented in FIGS. 5 and 6. This connector 51 is constituted by a part forming at its two ends 51a, 51b two perpendicular knife-blades 52, 53 one of which, called the first one 52, is designed to cooperate with the above-mentioned grip 41 whereas the other one 53, called the second one, is designed to establish the contact with one of the bars 14 of the power supply bus 12. It can also be seen in these figures that the first knife-blade 52 is provided with two guiding elements 52a, 52b extending on each side of said knife-blade 52 and designed to engage in a corresponding groove 42 of the case (FIG. 3). The second knife-blade 53 is designed more particularly to cooperate with one of the bars 14 of a bus 12 as represented in FIGS. 8 to 10.

According to this particular embodiment, this bus (or comb) 12 comprises an insulating profile A formed by a vertical bar support 13 extending parallel to the mounting rail 2 and by horizontal spacers 17 extending perpendicularly to said support 13, over its whole length. Each space separating two consecutive spacers 17 forms a housing for one of the conducting bars 14 of the bus 12, each of the bars 14 being securedly united to a flexible insulating bar 18. This flexible bar 18 extending over the whole length of the bar 14 presents an appreciably U-shaped transverse section one of whose wings 18a is securedly united to the bar 14 whereas the other wing 18b is curved under said bar 14 in the direction of the bar 14. It can be noted that the end of the spacers 17 is provided with stopping elements 17a participating in securing the bars in the profiled section.

Figure 14:
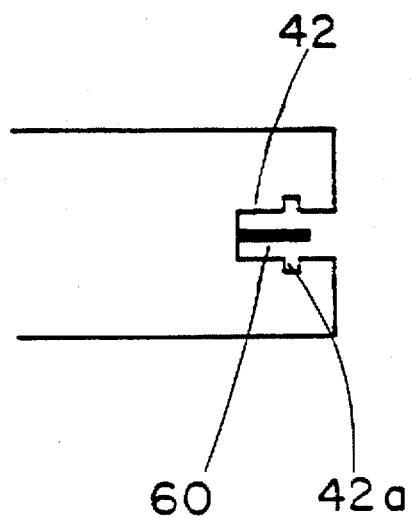
FIGS. 14, 15 and 16 illustrate respectively the up-line part of a single-pole apparatus seen from below, a connector in the form of a double-grip and a power supply bus, according to another embodiment of the invention.
Figure 15:
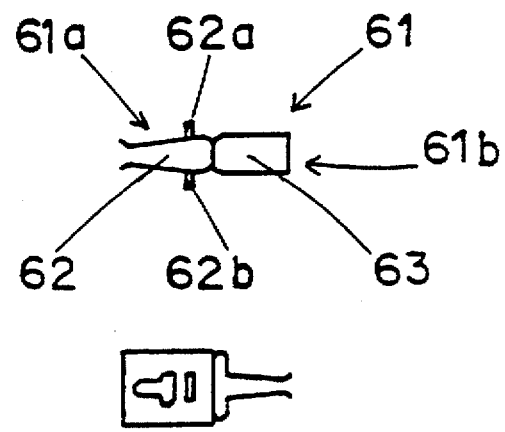
Figure 16:
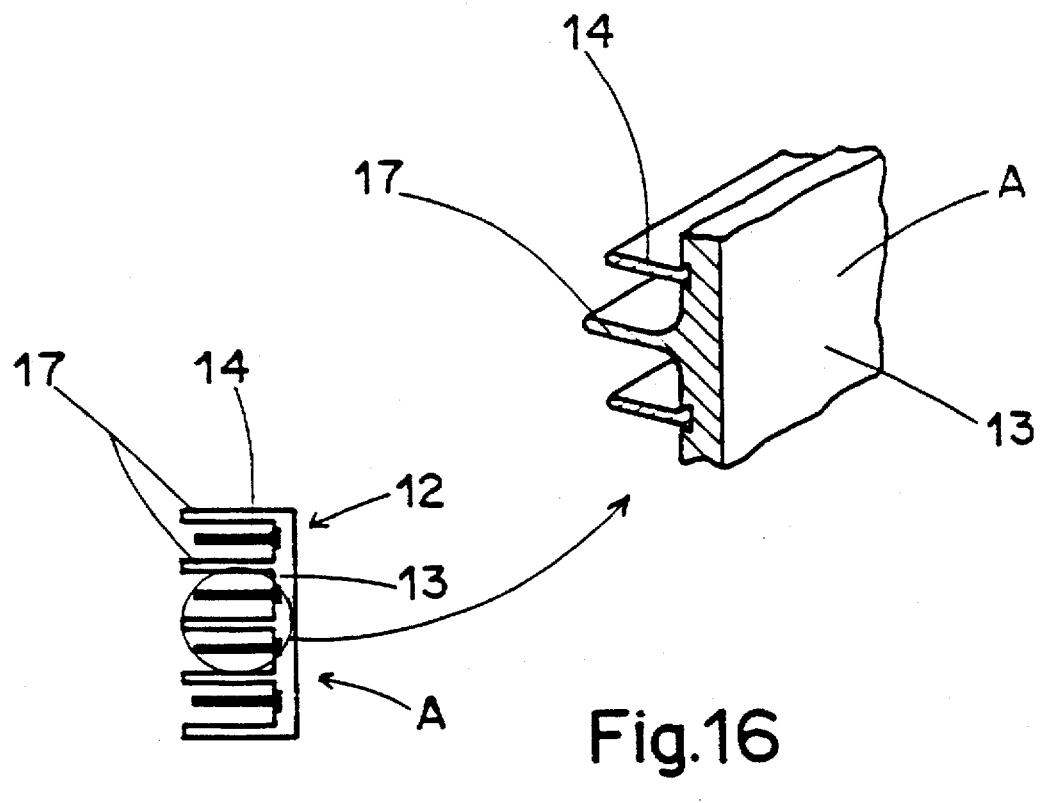

Referring to FIGS. 14, 15 and 16 it can be seen that according to another embodiment of the invention, the groove 42 provided in the rear part of each electrical apparatus presents a greater width than that of the previous embodiment. At the bottom of this groove 42 there is fixed a knife-blade 60 extending over the whole height of said groove 42 and forming the end of the contact strip of the corresponding power supply terminal. The connector 61 in this case is constituted by a part forming a grip at each of its two ends 61a, 61b, the two grips 62, 63 being perpendicular, that is to say that their gripping forces are perpendicular. One of the grips 62 comprises, as in the previous embodiment, guiding elements 62a, 62b of said grip 62 in the groove 42, whereas the other grip 63 is designed to cooperate with one of the conducting bars 14 of the power supply bus 12, said bars 14 being, in this particular embodiment, fixed directly by one of their ends to the vertical support 13 of an insulating profiled section A as illustrated in FIG. 16, between two consecutive spacers 17.

Electrical connection of a set of modular apparatuses to a power supply bus 12 will be described hereafter according to the first embodiment and then to the second embodiment, with reference to the figures.

In a first stage, the connectors 51 or 61 will be fitted in the rear part of the power apparatuses 3, 8, 9 which are to be connected to the bus 12. When these connectors 51, 61 are of the type with two knife-blades 52, 53, these blades will be inserted via their blades 52 comprising the guiding elements 52a, 52b into the grooves 42 provided in the cases and more precisely into the grips 41 located in these grooves 42, via the top of the apparatuses.

Figure 13:
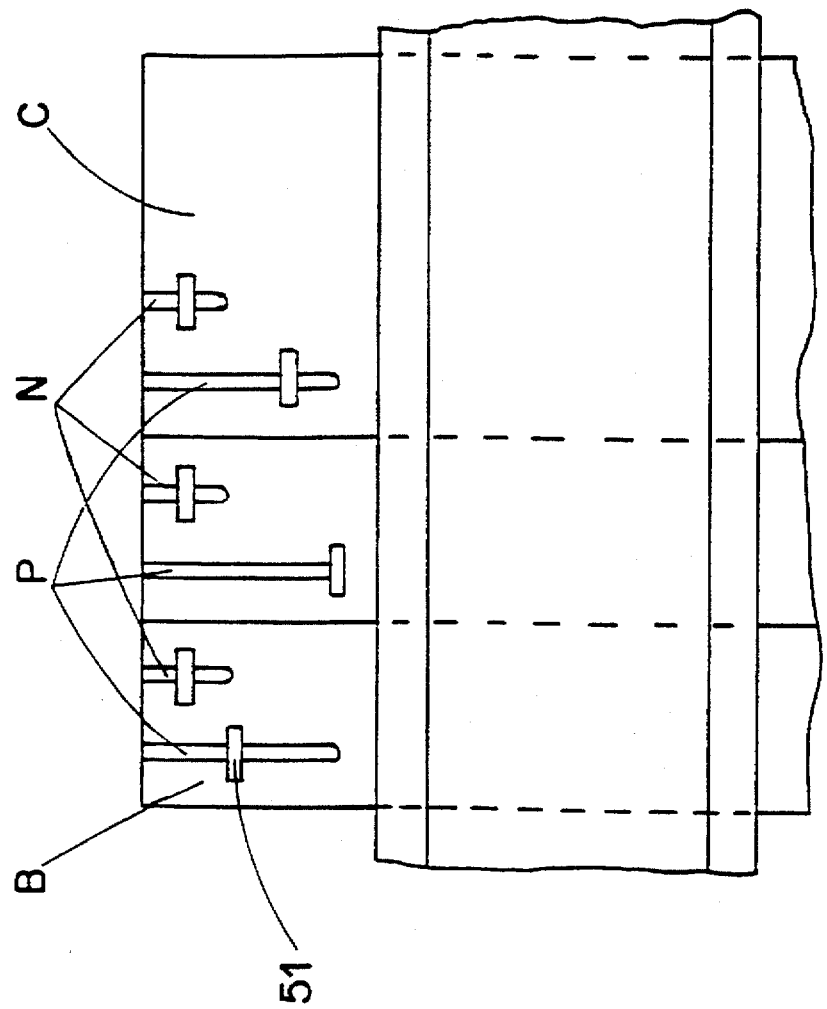
FIG. 13 is a rear view of "phase+neutral" and "differential phase+neutral" apparatuses equipped with their knife-blade connectors.
Figure 12:
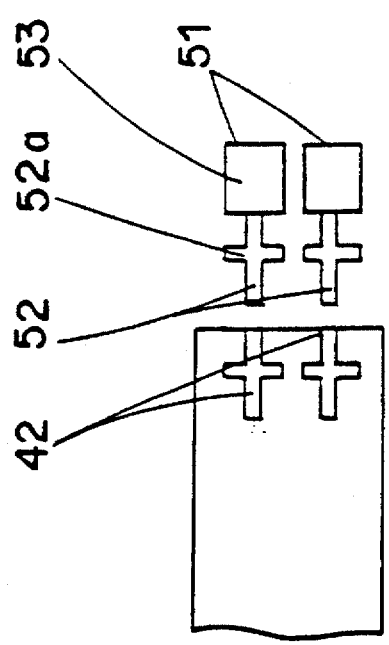
FIG. 12 is a partial bottom view illustrating fitting of two knife-blade connectors on a phase plus neutral apparatus.

Then these connectors 51 will be moved by sliding inside the grooves 42 to the required height, so as to be aligned on one of the bars 14 of the power supply bus 12, connected to the required power supply phase. It can thus be seen in FIG. 7 that four knife-blade connectors 51 are mounted respectively in the four cases of a power apparatus of the three-pole plus neutral type, in four different positions a, b, c, d in such a way as to be connected respectively to the neutral, to a first, a second and a third power supply phase. FIG. 12 illustrates another example, wherein the same principle is applied to a phase plus neutral apparatus, two knife-blades 51 being inserted in the same case. FIG. 13 illustrates the application of this principle to apparatuses of the phase plus neutral B and phase plus neutral C type. It can be seen that in this case the connectors 51 located on the phase P side will be advantageously positioned on different phases, with a view to obtaining a balancing of the consumptions, whereas the connectors 51 located on the neutral N side will all be located at the same level.

Figure 11:
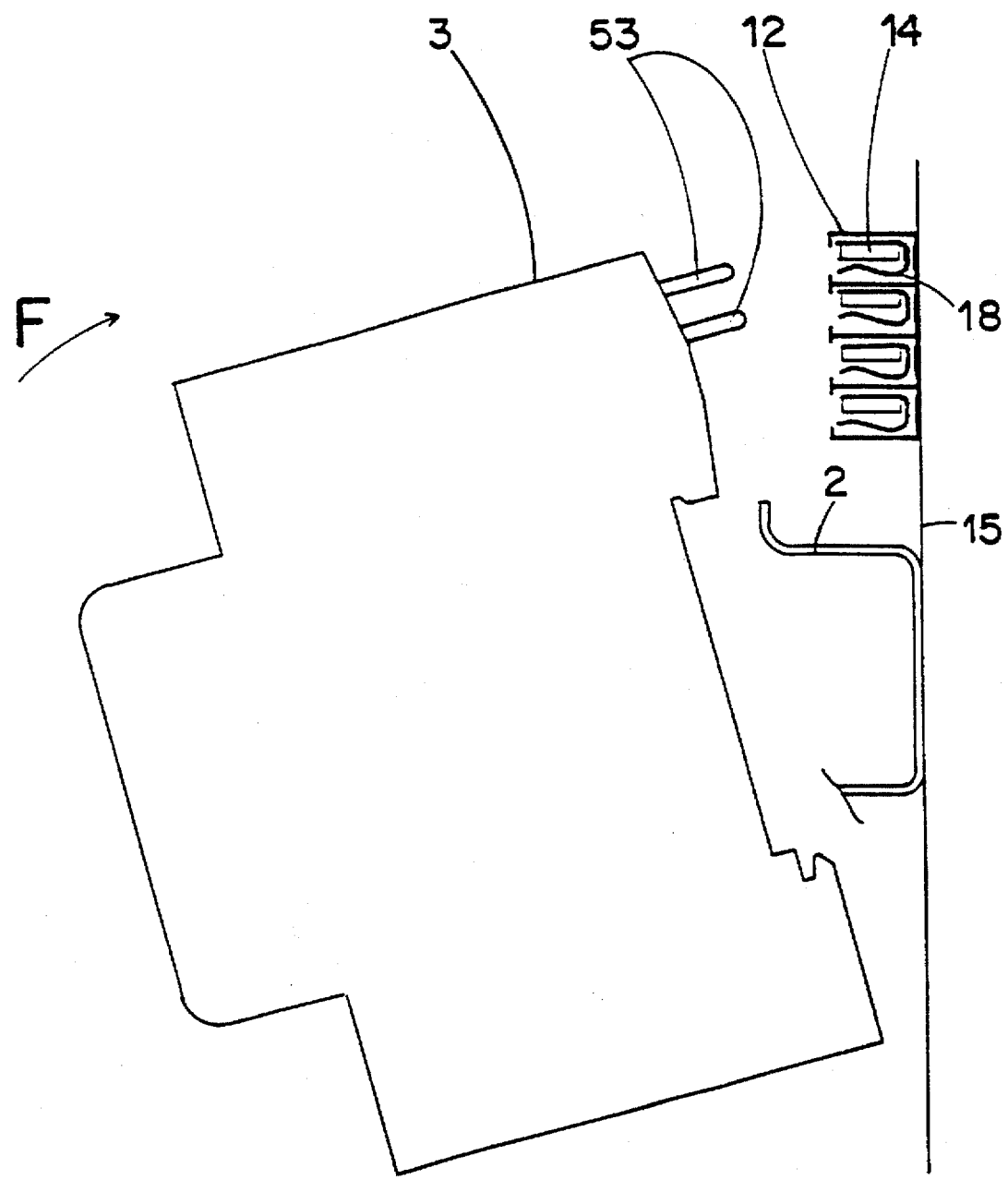
FIG. 11 illustrates, in a schematic view, mounting of an electrical apparatus on a rail and its electrical connection to a power supply bus according to the invention.

Once these connectors 51 have been fitted in place, the apparatuses 3, 8, 9 will be engaged on the lower part of the mounting rail 2, and will then be made to pivot according to the arrow F, as illustrated in FIG. 11. During this pivoting movement, the second knife-blades 53 of the connectors will be brought into contact with the corresponding bars 14 of the power supply bus 12 and kept in contact with these bars 14 due to the action of the flexible blades 18 associated to said bars 14. It can be noted that, although for the sake of simplicity only two knife-blade connectors 53 and one conducting bar 14 have been represented in FIG. 11, this mounting principle will be able to be used for any number of knife-blades and corresponding bars.

When the connectors 61 are of the type with two grips 62, 63, they will be inserted in the same way via the top of the apparatuses, in such a way that the vertical grips 62 engage on the corresponding knife-blades 60 fixed in the grooves 42 of the cases. Then these connectors 61 are moved to the suitable position so that the horizontal grips 63 can engage on the corresponding bars 14 of the bus 12 as illustrate in FIG. 16.

It can therefore be seen that the connectors can slide horizontally on the bus in order to position a given apparatus at any place on the DIN rail.

A device for assembly and connection of electrical apparatuses supplied up-line by a bus has therefore been achieved by means of the invention, enabling products of different pitches and of different kinds (power apparatuses, control and monitoring devices, auxiliaries) to be fitted on the same rail without it being necessary to recut comb teeth or to use fixing support accessories, as was previously the case.

It is thus possible to mount for example on the same rail apparatuses of the multipole type together with auxiliaries, apparatuses of the single-pole plus neutral and differential single-pole plus neutral type.

The invention also enables the other two connection possibilities conventionally used on power apparatuses to be kept, i.e. connection by cables or conventional comb (with teeth), via the tunnel of the case of each apparatus.

Naturally the invention is not limited to the embodiments described and illustrated which have been given as examples only.

On the contrary, the invention includes all the technical equivalents of the means described and their combinations if these are achieved according to the spirit of the invention.

We claim:

1. A circuit breaker device for assembly and electrical connection of a plurality of modular power apparatuses installed on a mounting rail with auxiliary units, said circuit breaker device comprising:

modular cases adjoined by their lateral sides to form a horizontal row;

power apparatuses residing within said modular cases and being electrically connected and/or supplied with power up-line by a common connecting comb in the form of a bus;

at least one conducting bar extending generally parallel to the longitudinal direction of the rail, and generally perpendicular to the lateral sides of said modular cases and facing said comb;

contact strips of each of said power apparatuses being electrically and selectively connected up-line to at least one conducting bar; connectors, each connector having a first end electrically connected to a contact strip and a second end for engaging a selected conducting bar, whereby the contact strip of each power apparatus forms an end part housed in a groove provided in a face of the modular case;

said groove being open in the direction of the comb, and said end part and groove extend perpendicularly to the at least one conducting bar over virtually the whole height of the common connecting comb to enable a connector to be connected to a contact strip in several positions along said end part, corresponding to a longitudinal position of at least one conducting bar.

2. The circuit breaker device according to claim 1, wherein the comb is located facing the rear upper faces of the modular cases.

3. The circuit breaker device according to claim 1, wherein the above-mentioned end part of the contact strip is formed by a grip housed in the bottom of the groove, said grip being designed to cooperate with an end part in the form of a knife-blade of the connector.

4. The circuit breaker device according to claim 1, wherein the above-mentioned end part of the contact strip is formed by a knife-blade extending perpendicularly to the bars, said knife-blade being designed to cooperate with an end of the connector in the form of a grip.

5. The circuit breaker device according to claim 1, wherein the common connecting comb (or bus) comprises an insulating profiled section formed by a support extending parallel to the surface of the rail and spacers extending perpendicularly to said support, a conducting bar being housed in each space separating two consecutive spacers.

6. The circuit breaker device according to claim 5, wherein the second end of the connectors is formed by a knife-blade and each of at least one conducting bar is securedly united to a flexible blade curved under the conducting bar, the knife-blade being engaged and held between the conducting bar and the flexible blade in the contact position.

7. The circuit breaker device according to claim 5, wherein the second end of the connectors is formed by a grip designed to engage with one of the bars fixed on the above-mentioned support between two spacers.

8. The circuit breaker device according to claims 3 or wherein each connector is formed by two perpendicular knife-blades.

9. The circuit breaker device according to claims 4 or wherein each connector is formed by two grips placed end to end whose gripping forces are perpendicular.

10. The circuit breaker device according to claim wherein the first end of the connectors is provided with transverse guiding elements cooperating with a corresponding groove provided in the case in order to improve the positioning of the connector in the case.

11. The circuit breaker device according to claim 1, wherein said power apparatuses are single and multiple pole as required by contactors, switches and remote-controlled switches, and the auxiliary units comprise at least unit selected from the group consisting of a fault indication SD, a contact position CAOF module, an undervoltage MN or shunt MX trip module, and a differential tripping module.

12. The circuit breaker device according to claim 1, wherein the connectors are integral parts of the end parts of the corresponding contact strips.

13. The circuit breaker device according to claim 11, wherein the connectors are securedly united for example by welding to the end parts of the corresponding contact strips.

* * * * *